3,518,121
NONAQUEOUS AMMONIA PRIMARY CELL UTILIZING NITRATED POLYSTYRENE CATHODE OXIDANT
Charles P. Haber, Riverside, and Gerald E. McWilliams, Corona, Calif., assignors to the United States of America as represented by the Secretary of the Navy
No Drawing. Filed July 16, 1969, Ser. No. 842,363
Int. Cl. H01m 15/00
U.S. Cl. 136—83       8 Claims

ABSTRACT OF THE DISCLOSURE

Ammonia batteries using polynitrostyrenes as the active oxidant in a conductive cathode matrix; the polymeric oxidant being insoluble in the electrolyte does not migrate physically allowing efficient battery operation for extended periods of time.

---

The invention herein described may be manufactured and used by or for the Government of the United States of America for governmental purposes without the payment of any royalties thereon or therefor.

Ammonia batteries have been designed for short life usually a few minutes to a few hours, and high drain rates of 100 milliamps/cm.$^2$ or higher. When operating to these requirements, m-dinitrobenzene and its derivatives have been satisfactory as the cathode oxidant. However, when the batteries were considered for longer life (one to seven days) the batteries failed. Single cell test results and post mortem examination of cell parts showed excessive corrosion at the anode, and the presence of large quantities of unidentified black material deposited throughout the cell from undesirable side reactions. Since m-dinitrobenzene cathode oxidant is soluble in the electrolyte, it dissolves at the cathode site and migrates to the anode where it interacts, causing corrosion. In addition, to the extent that reduction of the cathode oxidant occurs away from the immediate vicinity of the cathode matrix, the energy from this reduction is not available in the battery output and constitutes a loss in efficiency.

The present invention provides a cathode oxidant for ammonia batteries which is insoluble in the electrolyte and allows such batteries to last for extended periods of time (e.g. days) at moderate drain rates, unlike m-dinitrobenzene oxidant which is soluble in the electrolyte and limits battery performance to minutes. This invention uses nitrated polystyrenes in a conductive cathode matrix to provide improved primary cells for batteries.

Other objects and many of the attendant advantages of this invention will become readily appreciated as the same becomes better understood by reference to the following detailed description:

By making the cathode oxidant insoluble in the electrolyte of an ammonia battery, migration to the anode cannot occur. To find such a cathode oxidant it was essential to provide a material equivalent electrochemically to the standard cathode oxidant, m-dinitrobenzene, but which would be insoluble in the electrolyte and easier to handle in cell assembly. It was found that nitrated polystyrenes substantially behaved electrochemically like m-dinitrobenzene but was insoluble in the ammonia electrolyte. By combining polynitrostyrenes as the insoluble active cathode oxidant with either the standard matrix conductor, carbon, or with silvered glass fibers or silvered diatomaceous earth into a complete cathode structure, ammonia battery cells having long life and moderate current density performance can be achieved as herein discussed.

Polystyrene was nitrated to an average nitro group of 1.75 nitro groups per phenyl ring (i.e., a mixture of polynitrostyrene and polydinitrostyrene). Polystyrene nitrated in the range from 1 to 2 nitro groups per phenyl ring can be used. The nitrated polystyrene material was incorporated with a cathode matrix conductor and a suitable source of acid (i.e., $NH_4NO_3$ in liquid ammonia) and evaluated in half cell tests and single cell tests with the following results:

Based on completely nitrated polystyrene the results are as follows:

$$\frac{\text{Formula wt. of nitrated polystyrene}}{\text{No. of } e^- \times \text{formula wt. of } NH_4NO_3} = \frac{194}{960} = \frac{1}{4.95}$$

Since 1 mole $e^- = 96,500$ coulombs for 1 $e^-$ reaction, $$\frac{96,500}{\frac{194+960}{12} \times 60} = 16.7 \text{ a.-min./g.} = 1,000 \text{ a.-sec./g.}$$

For a 12-electron reaction, the maximum theoretically possible under ideal conditions, at 1 ma., the reduction time for 9 mg. would be 150 min. Since the actual measured time was 134 min., the number of electrons delivered, based on observations, was $$\frac{150}{12 \times 134} = 10.7$$

Thus, the efficiency of the reaction approximated the theoretical capacity.

Single cells were constructed using nitrated polystyrenes as the cathode oxidant and a relatively insoluble acid, $(NH_4)_2SO_4$, with KSCN electrolyte dissolved in liquid anhydrous ammonia and magnesium anodes. These cells discharged above minimum required voltage greater than six times longer than cells using the soluble cathode material.

An exceptionally stable, electrically-conductive, high surface area matrix as the cathode matrix conductor for the nitrated polystyrenes active cathode oxidant can be made from silvered short thin glass fibers or silvered diatomaceous earth. These materials are better electrical conductors than the standard carbons used for matrix conductors. These silvered materials are also better thermal conductors, allowing better cooling in high current batteries and the silver gives a lower "over voltage" allowing for more efficient use of the cathode oxidant.

Silvering of these materials are done by the Brashear process. The silvered glass fibers or diatomaceous earth readily lend themselves to various means of fabrication to form the matrix in a cell by molding, pasting, packing, etc., and the active cathode oxidant material is mixed therewith as a filler.

The test results indicated that the nitrated polystyrene oxidant gives a factor of six or better performance in the duration factor of cell discharge. Because of its polymeric nature, this cathode oxidant can be formed into sheets, pellets, etc., giving rise to more flexible cell design. As desired, the acid (e.g. $(NH_4)_2SO_4$) and electronically conductive matrix material (e.g., carbon, silvered glass fibers or silvered diatomaceous earth) can be incorporated as fillers and the total cathode structure formed in the desired shape as an integral body. Because of the inherent coherent nature of polymeric bodies, multiple cell assembly is simplified since fragmentation and crumbling are eliminated. The improved electrical performance and improved mechanical integrity result in easier and more reliable assembly processes. The cathode described herein also lends itself to other solvent battery systems using aqueous or propylene carbonate solvents for example. Other nitrated aromatic polymers such as polyvinyl naphthalene can also be used.

What is claimed is:

1. In a nonaqueous ammonia primary cell having an anode, electrolyte and cathode, the improvement comprising electrolyte insoluble nitrated polystyrene having a range of nitro group content of from 1 to 2 nitro groups per phenyl ring as the active cathode oxidant material.

2. A primary cell as in claim 1 wherein said nitrated polystyrene has an average nitro group content of 1.75 nitro groups per phenyl ring.

3. A primary cell as in claim 1 wherein said nitrated polystyrene is polydinitrostyrene.

4. A primary cell as in claim 1 wherein said nitrated polystyrene cathode oxidant material has insoluble acid and conductive matrix materials incorporated as fillers therewith and formed into desired shape as an integral cathode structure.

5. A primary cell as in claim 1 wherein said nitrated polystyrene is mixed with matrix conductor materials to form a complete cathode structure.

6. A primary cell as in claim 5 wherein said matrix conductor material is carbon.

7. A primary cell as in claim 5 wherein said matrix conductor material is silvered glass fibers.

8. A primary cell as in claim 5 wherein said matrix conductor material is silvered diatomaceous earth.

References Cited

UNITED STATES PATENTS

| | | | |
|---|---|---|---|
| 2,992,289 | 7/1961 | Meyers | 136—90 |
| 2,996,562 | 8/1961 | Meyers | 136—6 |
| 3,185,590 | 5/1965 | Mayer et al. | 136—6 |
| 3,235,408 | 2/1966 | Harris | 136—90 |
| 3,239,384 | 3/1966 | Meyers | 136—90 |
| 3,423,242 | 1/1969 | Meyers et al. | 136—6 |

WINSTON A. DOUGLAS, Primary Examiner

A. SKAPARS, Assistant Examiner

U.S. Cl. X.R.

136—100, 137